(12) United States Patent
Lanard et al.

(10) Patent No.: US 8,998,300 B2
(45) Date of Patent: Apr. 7, 2015

(54) FRONT-END MODULE FOR A VEHICLE, PARTICULARLY A MOTOR VEHICLE

(75) Inventors: Jean-Louis Lanard, Feucherolles (FR); Jean-Nicolas Guyomard, Le Mesnil Fuguet (FR); Leonardo Camargo, Stella Maris Salvador (BR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 0 days.

(21) Appl. No.: 14/234,794

(22) PCT Filed: Jul. 24, 2012

(86) PCT No.: PCT/EP2012/064488
§ 371 (c)(1),
(2), (4) Date: Mar. 19, 2014

(87) PCT Pub. No.: WO2013/014148
PCT Pub. Date: Jan. 31, 2013

(65) Prior Publication Data
US 2014/0197661 A1    Jul. 17, 2014

(30) Foreign Application Priority Data
Jul. 26, 2011   (FR) ...................................... 11 56829

(51) Int. Cl.
*B60N 99/00* (2006.01)
*B62D 21/15* (2006.01)
*B62D 25/08* (2006.01)

(52) U.S. Cl.
CPC ............ *B62D 21/152* (2013.01); *B62D 25/084* (2013.01); *B62D 25/08* (2013.01)

(58) Field of Classification Search
USPC ........................................ 296/187.09, 193.09
See application file for complete search history.

(56) References Cited

U.S. PATENT DOCUMENTS

| 7,213,873 B2 * | 5/2007 | Murata et al. ................. 296/204 |
| 7,887,123 B2 * | 2/2011 | Honji et al. ............. 296/187.09 |
| 2009/0146455 A1 * | 6/2009 | Honji et al. ............. 296/187.09 |

(Continued)

FOREIGN PATENT DOCUMENTS

| DE | 102 60 171 A1 | 7/2004 |
| DE | 10 2005 058 180 A1 | 6/2007 |
| EP | 2 080 690 A1 | 7/2009 |

OTHER PUBLICATIONS

English language abstract and machine-assisted English translation for DE 102 60 171 extracted from espacenet.com database on Jun. 2, 2014, 20 pages.
Machine-Assisted English language abstract and Machine-Assisted English language translation for DE 10 2005 058 180 extracted from espacenet.com database on Jun. 2, 2014, 32 pages.

(Continued)

*Primary Examiner* — Lori L Lyjak
(74) *Attorney, Agent, or Firm* — Howard & Howard Attorneys PLLC

(57) ABSTRACT

A front-end module for a vehicle, particularly a motor vehicle, includes a support frame (1) and at least one flange (2) for coupling the support frame (1) to a chassis of the vehicle, the flange (2) being configured so as to enable the free positioning of the module relative to the chassis within a plane orthogonal to a direction X of movement of the vehicle, as well as the attachment of the module onto the chassis in accordance with the positioning, the flange (2) and the support frame (1) being mutually configured so as to be attached to each other while enabling the movement of one relative to the other in the direction X in the event of impact.

17 Claims, 4 Drawing Sheets

(56) References Cited

U.S. PATENT DOCUMENTS

Figure 1:
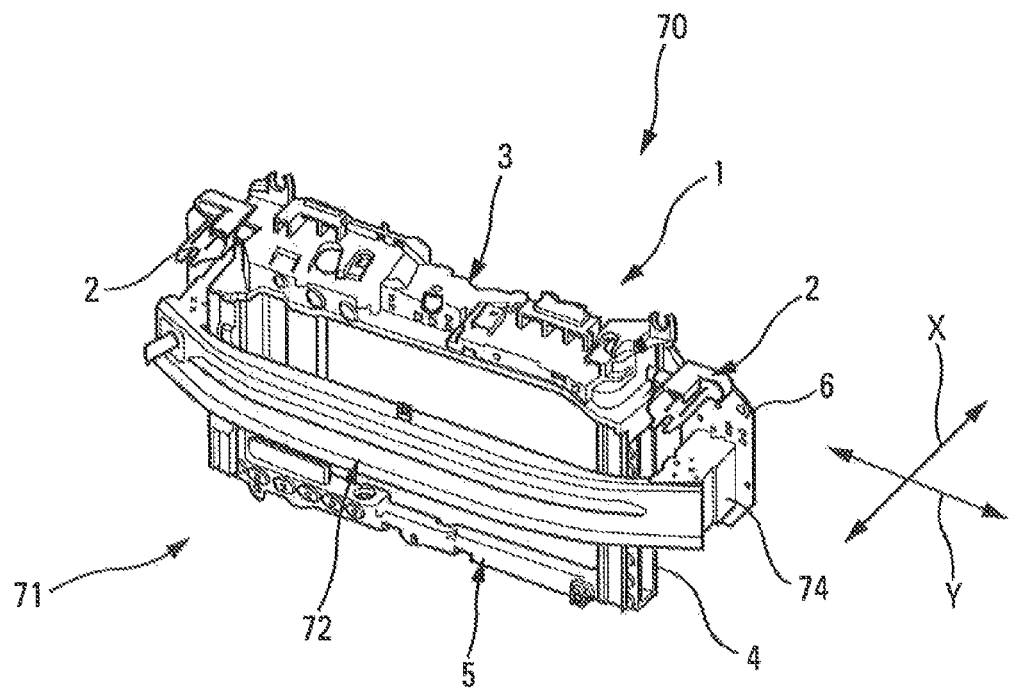

2011/0140464 A1 6/2011 Mildner
2011/0308870 A1* 12/2011 Rasset et al. .......... 180/68.4

OTHER PUBLICATIONS

International Search Report for Application No. PCT/EP2012/064488 dated Aug. 27, 2012, 5 pages.

* cited by examiner

FRONT-END MODULE FOR A VEHICLE, PARTICULARLY A MOTOR VEHICLE

RELATED APPLICATIONS

This application is the National Stage of International Patent Application No. PCT/EP2012/064488, filed on Jul. 24, 2012, which claims priority to and all the advantages of French Patent Application No. FR 11/56829, filed on Jul. 26, 2011, the content of which is incorporated herein by reference.

The present invention relates to a front-end module of a vehicle, notably a motor vehicle, and a flange and a support frame for such a module. It also relates to an assembly of such a module and an impact absorption device.

A front-end module is a structural element likely to incorporate various vehicle equipment items, such as headlights, blinkers, horn, heat exchanger or complete cooling module, etc. It is intended to be mounted, pre-equipped with said elements, on the chassis of the vehicle. Such a mounting method makes it possible to optimize the vehicle manufacturing process by at the same time mounting elements directly on the chassis and mounting the front-end module, the latter then being added to the chassis.

Front-end modules are thus known that comprise a support frame that makes it possible to fasten front-end equipment elements, the module being fastened to the chassis by said frame.

That said, various difficulties need to be resolved. The front end must first of all allow for impact absorption. For this, there has already been provided a mounting of the support frame on the chassis of the vehicle that allows the support frame to be driven backward in the event of a front impact.

The front end must also participate in the overall appearance of the vehicle by ensuring an esthetic interface between the bodywork of the vehicle and the equipment elements, that are externally visible, that said front end incorporates. In the case of front ends provided with headlights, it is thus necessary for the positioning of the front end to allow for a slot to be arranged between the outline of the headlights and the neighboring bodywork elements that is as thin and regular as possible.

Such a constraint is all the more difficult to manage when the manufacturing precision of the chassis is low. To resolve this problem, various solutions allowing for an adjustment of the positioning of the support frame when it is fastened to the chassis can be envisaged. However, they involve making the link between the support frame and the chassis rigid in a way that is incompatible with the impact absorption objectives mentioned above.

The invention aims to improve the situation and, to this end, proposes a front-end module of a vehicle, notably a motor vehicle, comprising a support frame and at least one flange for coupling the support frame to a chassis of the vehicle, said flange being configured to allow for a free positioning of the module relative to the chassis in a plane orthogonal to a direction X of movement of the vehicle as well as a fastening of said module to said chassis according to said positioning, said flange and said support frame being mutually configured to be fastened to one another while allowing a movement of one relative to the other in the event of impact.

By virtue of said flange, an intermediate piece is provided which makes it possible to fasten the front end relative to the chassis of the vehicle in the desired position while retaining a link with at least one degree of freedom between the front-end support frame and said chassis. There is thus the benefit of a front end that fits esthetically in the vehicle while allowing for impact absorption.

The degree of freedom retained between the flange and the support frame will in particular allow a movement in the direction X of movement of the vehicle or at the very least a movement including a component in said direction X.

"Free positioning of the module in the plane" should be understood to mean a free positioning in at least one direction, for example in the direction Y that is horizontal and orthogonal to the direction X of movement of the vehicle.

According to different embodiments of the invention, which will be able to be taken together or separately:
- the support frame is provided with a recess to accommodate said flange, said recess being configured to allow, on the one hand, a fastening between the flange and the support frame according to a force of given direction, having a component in a direction Y horizontal and orthogonal to the direction X of movement of the vehicle and, on the other hand, a guiding of the support frame relative to the chassis in said direction X of movement of the vehicle in the event of impact,
- the recess comprises a top guiding wall and/or a bottom guiding wall,
- the bottom guiding wall is intended to cooperate with a bottom wall of the flange as abutment in the event of force exerted upward on the support frame,
- the top guiding wall is intended to cooperate with a top wall of the flange to support said support frame,
- said recess comprises a side wall, provided with a slot for the passage of a fastening rod of the support frame, said rod being oriented in the direction given to the fastening force,
- said slot has a form that flares outward in the direction X of movement of the vehicle,
- the recess has a bottom wall provided with an opening, intended to be oriented along the axis X of movement of the vehicle and cooperating with a guiding pin of the coupling flange,
- said flange comprises a recess for the passage of said fastening rod of the support frame,
- said flange comprises a recess for the passage of a rod for fastening to the chassis of the vehicle,
- said flange comprises a recess for fastening headlights or optical blocks of the vehicle.

The invention also relates to a flange and a support frame for a front-end module, as described above.

The invention also relates to an assembly of a front-end module as described above and an impact absorption device.

The impact absorption device comprises, for example, plates for fastening a bumper beam and the coupling flange or flanges are fastened to said plates.

Figure 3:
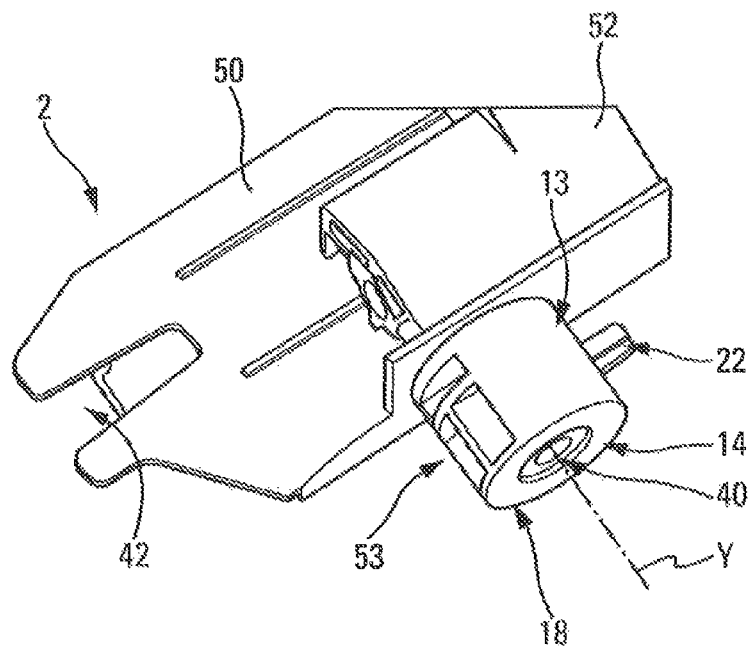
Figure 2:
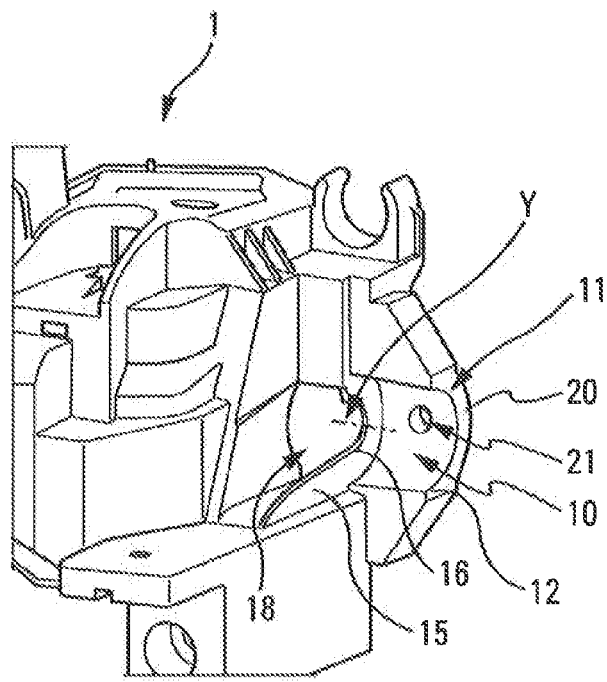
Figure 4A:
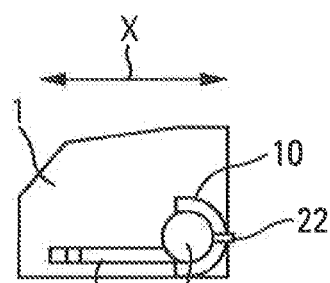
Figure 4B:
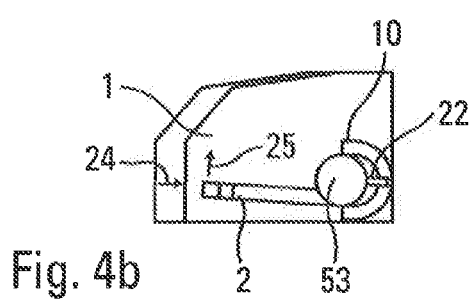
Figure 4C:
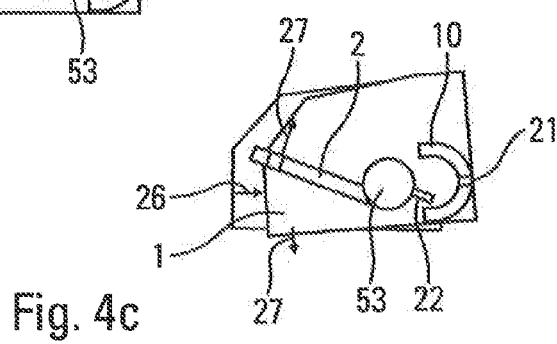
Figure 5:
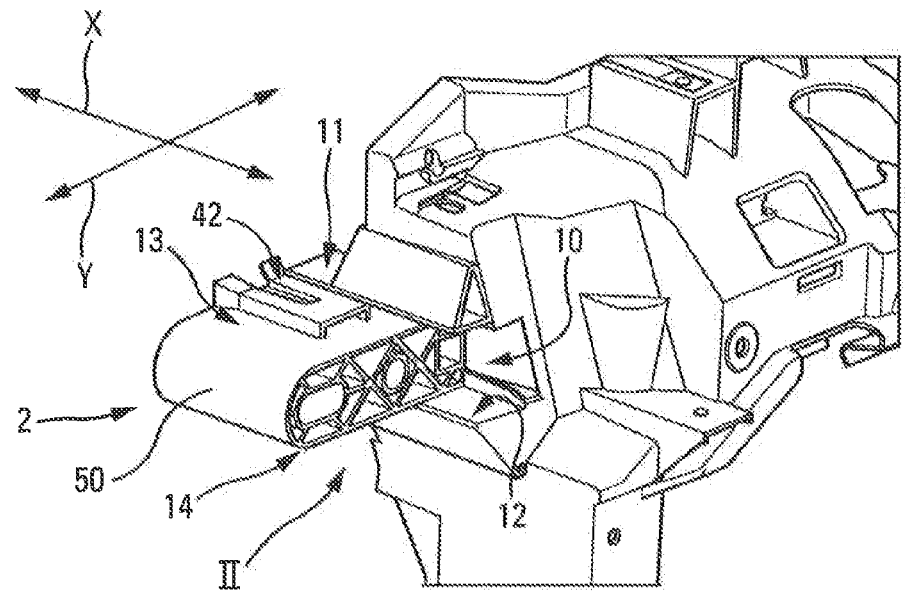
Figure 6:
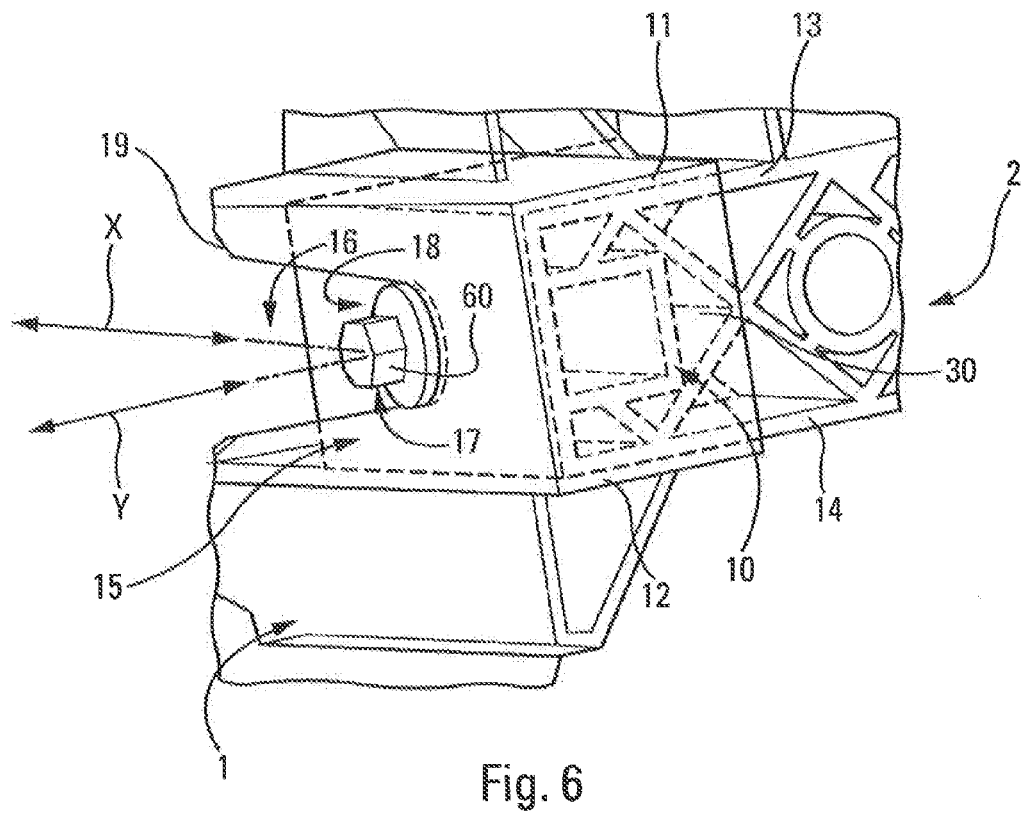
Figure 7:
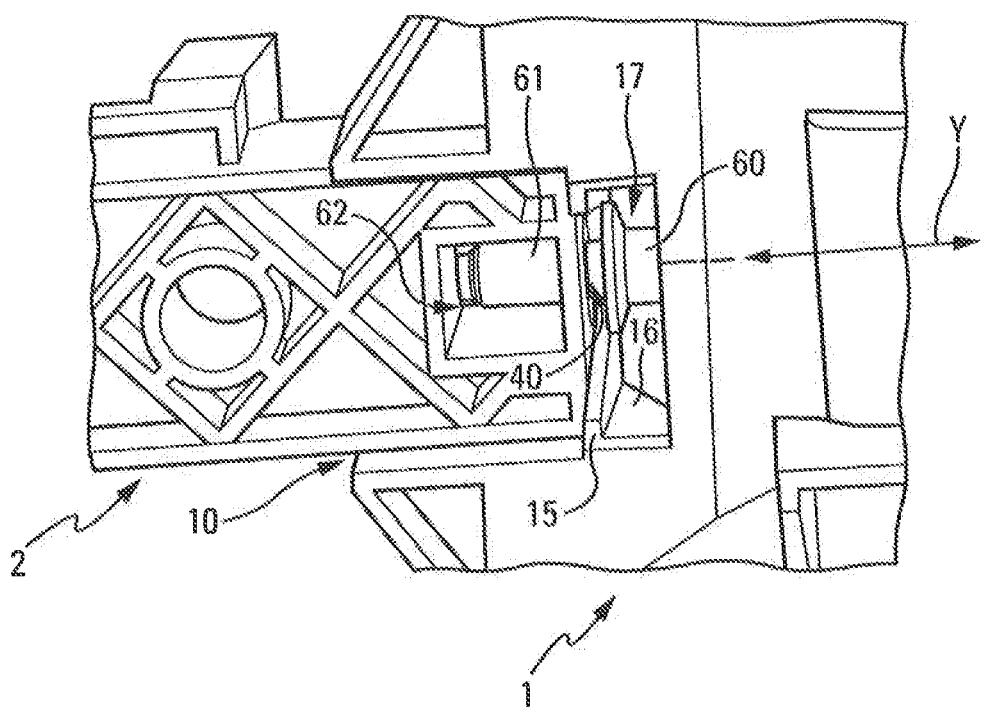

The invention will be better understood on reading the following description accompanied by the appended drawings in which:

FIG. 1 is a perspective illustration of an exemplary impact absorption device and a support frame and a coupling flange of an exemplary front-end module according to the invention, FIG. 2 is a partial perspective illustration of the support frame of FIG. 1, FIG. 3 is a perspective illustration of the coupling flange of FIG. 1, FIGS. 4a to 4c show, on a cross-sectional plane, a schematic representation of the movements between the coupling flange and the support frame of FIGS. 2 and 3, in the event of impacts, FIG. 5 is a partial perspective illustration of a variant support frame and coupling flange, according to the invention, from a first viewing angle, FIG. 6 illustrates a part referenced II in FIG. 5, from another viewing angle, FIG. 7 is a view of the part II of FIG. 5, from a third viewing angle.

As illustrated in FIG. 1, the invention relates to a front-end module of a vehicle, notably a motor vehicle. It comprises a support frame 1 and at least one flange 2 for coupling the support frame 1 to a chassis of the vehicle.

The front-end module supports, for example, various equipment elements, not represented, such as a hood lock, heat exchangers, headlights or optical blocks, tanks for different fluids and/or other items. All or some of said equipment items are fastened, in particular, to the support frame 1.

Said support frame 1 comprises, in particular, a top crossmember 3, side legs 4 and/or a bottom crossmember 5. "Crossmember" should be understood to mean any element extending substantially horizontally in a direction Y, intended to be horizontal and orthogonal to a direction X of movement of the vehicle.

The front end will be able to include a flange 2 on either side of said support frame 1, at each longitudinal end of the top crossmember 3. These are, notably, flanges 2 that are identical or at the very least symmetrical to one another.

According to the invention, said flange 2 is configured to allow a free positioning of the module in relation to a chassis of the vehicle in a plane orthogonal to the direction X of movement of the vehicle and a fastening of said module to said chassis according to said positioning.

Still in FIG. 1, it can be seen that the flanges 2 allow an adjustment of their positioning relative to the chassis, in particular relative to fastening plates 6, and thus allows a good positioning of the front end according to the configuration of the vehicle. This makes it possible to make up for manufacturing dispersions, notably the distance differences between the fastening plates 6 and/or the variations of positioning of the bodywork elements with which the front end is intended to create an interface that is visible from outside the vehicle.

Furthermore, said flange 2 and said support frame 1 are mutually configured to be fastened to one another while allowing a movement of one relative to the other in said direction X in the event of impact. Thus, although the front end can be freely positioned relative to the chassis, its support frame keeps at least one degree of freedom enabling it, and the equipment elements that it supports, to avoid being too severely damaged following a collision.

As more particularly illustrated in FIGS. 2 and 5 to 7, the support frame 1 will be able to be provided with a recess 10 to accommodate said flange 2. Said recess 10 is configured to allow, on the one hand, a fastening between the flange 2 and the support frame 1, according to a force of given direction, having a component in the direction Y, and, on the other hand, a guiding of the support frame 1 relative to the chassis in the direction X of movement of the vehicle in the event of impact. The fastening force is here oriented in the direction Y.

The recess 10 comprises, for example, a top guiding wall 11 and/or a bottom guiding wall 12.

The top guiding wall 11 is intended to cooperate with a top wall 13 of the flange 2 to support said support frame 1. The support frame 1, via its top guiding face 11, thus rests at least partly on the flange 2, not only in the normal position but also upon their movement in the event of impacts.

The bottom guiding wall 12 is intended to cooperate with a bottom wall 14 of the flange 2 as abutment in the event of force exerted upward on the support frame 1. In particular, for front ends incorporating the hood lock, it will enable the front end to withstand the vertical forces exerted by the hood on the front end via the lock, under the effect of the vibrations to which the vehicle is subject when traveling.

Said recess will also be able to include a side wall 15, provided with a slot 16 for the passage of a fastening rod 17 (not represented in FIG. 2) of the support frame 1. Said slot 16 has, for example, a form that flares outward in the direction X of movement of the vehicle. Its outline is, here, open at one of its ends 19. Said fastening rod 17 is oriented in the direction given to the fastening force, here the direction Y. It will be understood that, in normal mode, the fastening rod 17 maintains the support frame 1 on the coupling flange 2 and that, in the event of impacts, the fastening rod 17 can move in the slot 16 (along the axis X). Said side wall 15 provides guidance, plane against plane, in the direction X, with a side face 18 of the flange 2.

According to the embodiment of FIGS. 2 to 4, the recess 10 has a bottom wall 20, provided with an opening 21, intended to be oriented along the axis X and cooperating with a guiding pin 22 of the coupling flange 2. The recess 20 is here in the form of a cup of substantially semi-cylindrical section that opens toward the front (in the direction X) and toward the side, on a face opposite its side wall 15, to accommodate the flange 2. The opening 21 is situated in the bottom 20 of the cup.

FIGS. 4a to 4c illustrate the relative movements of the support frame 1 and of the coupling flange 2 in the event of impacts. In FIG. 4a, in the normal position, the flange 2 is in the recess 10 and the pin 22 is in the opening 21.

In FIG. 4b, an impact has occurred and the support frame 1 moves toward the rear relative to the flange 2 according to the arrow referenced 24. The pin 22 has then partially emerged from the opening 21. The flange 2 will also be able to be driven in rotation upward, according to the arrow referenced 25, around the fastening rod (not represented), then also acting as pivot. There is thus a guidance both translational rearward along the axis X and rotational about an axis oriented in the direction Y. The semi-cylindrical form of the recess 10 allows this dual movement and an elasticity will be given to the pin 22 to withstand the resulting deformations.

In FIG. 4c, the deformation of the front end is continued under the action of the impact. The support frame 1 and said flange 2 move relative to one another under the action of the same dual translational movement, according to the axis X, as illustrated by the arrow referenced 26, and rotational movement about the fastening rod oriented in the direction Y, as illustrated by the arrows referenced 27. By virtue of the degrees of freedom thus given to the support frame 1 relative to the chassis via the flange 2, it can be seen that the risks of rupture of the frame 1 in the event of an impact are effectively reduced.

According to the embodiment of FIGS. 5 to 7, the recess 10 is of parallelepipedal form. It comprises a bottom wall 30 which will be able to serve as abutment for the flange 2. It opens toward the front (in the direction X) and toward the side, on a face opposite its side wall 15, to accommodate the flange 2. It guides the support frame 1 in translation, in the direction X, relative to the flange 1, throughout the impact.

In FIG. 5, the module is seen from the front, from above and from the side. FIG. 6 is an almost opposite viewing angle. FIG. 7 is once again a viewing angle from the front, in a direction very slightly offset upward and to the side relative to the direction X.

As more particularly illustrated in FIGS. 3 and 5 to 7, said flange 2 comprises, for example, a recess for the passage of said rod 17 for fastening the support frame. It will also be able to include a recess 41 for the passage of a rod, not illustrated, for fastening to the chassis of the vehicle. Said recesses of the flange are, for example, of round and/or oblong section.

Said flange 1 will also be able to include a recess 42 for fastening headlights or optical blocks of the vehicle. Thus, as a variant, the headlights or optical blocks are not added to the support frame 1 but to the coupling flange 2.

According to the embodiment of FIGS. 2 to 4, said flange 2 has, for example, a planar part 50, having the recess 42 for fastening the headlight. Said planar part is locally topped by a first block 52, here of cellular and/or compartmented structure. Said first block 52 comprises the recess for fastening to the chassis. A second block 53, here also of cellular and/or compartmented structure, is laterally added to said first block 52. Said second block 53 comprises the recess 40 for the fastening rod of the support frame. Top, bottom and side faces of said second block 43 respectively define the top 13, bottom 14 and side 18 walls mentioned above, like said pin 22.

According to the embodiment of FIGS. 5 to 7, the flange consists of a body of substantially parallelepipedal form. Said body is, notably, of cellular and/or compartmented structure. Top, bottom and side faces of said body respectively define the top 13, bottom 14 and side 18 walls mentioned above. The side wall 50 opposite that defining the side wall 18 will be able to be of rounded form.

That said, the fastening rod 17 consists, for example, of a nut provided with a head 60. It cooperates with the flange 2, in particular, via a screwing sleeve 61, secured in a compartment 62 (visible in FIG. 7 for the embodiment concerned) of said flange 2, the recess 40 for the passage of said fastening rod 17 emerging in said compartment 62. As a variant, it will be able to be screwed into said recess 40, provided tapped.

After screwing, the head 60 of the nut bears against a face of the side wall 15 of the recess 10 of the support frame 1 and the face of the side wall 18 of the flange 2 bears against an opposite face of said side wall 15 of the recess 10 of the support frame 1.

The invention also relates to a flange for a front-end module, as described above. Said flange 1 is, in particular, made of plastic material. It will, however, be able to be any other type of material.

The invention also relates to a support frame for a front-end module, as described above. It will be able to be a single-piece construction or assembled from a plurality of elements. Said element or elements are, in particular, made of metal, plastic or of a hybrid metal-plastic material.

Referring once again to FIG. 1, the invention also relates to an assembly of a front-end module 70 as described above and of an impact absorption device 71.

Said assembly will be able to be configured to be mounted as a block on the stringers of the vehicle chassis.

The impact absorption device 71 comprises, for example, a bumper beam 72 fastened to the fastening plates 6. Said bumper beam 72 extends transversally between said fastening plates 6 to which it will be able to be fastened via an impact absorber 74.

The coupling flanges 2 of the front-end module are mounted on said fastening plates 6, in particular, in their top part.

The invention claimed is:

1. A front-end module of a vehicle, comprising a support frame (1) and at least one flange (2) for coupling the support frame (1) to a chassis of the vehicle, the support frame (1) including a recess (10) receiving a portion of flange (2) and the flange (2) being configured to allow for a free positioning of the front-end module relative to the chassis in a plane orthogonal to a direction X of movement of the vehicle as well as a fastening of the front-end module to the chassis according to the positioning, the flange (2) and the support frame (1) being mutually configured to be fastened to one another while allowing a movement of one relative to the other in the direction X in the event of impact.

2. A front-end module of a vehicle, comprising a support frame (1) and at least one flange (2) for coupling the support frame (1) to a chassis of the vehicle, the flange (2) being configured to allow for a free positioning of the front-end module relative to the chassis in a plane orthogonal to a direction X of movement of the vehicle as well as a fastening of the front-end module to the chassis according to the positioning, the flange (2) and the support frame (1) being mutually configured to be fastened to one another while allowing a movement of one relative to the other in the direction X in the event of impact; and wherein the support frame (1) is provided with a recess (10) to accommodate the flange (2), the recess (10) being configured to allow, on the one hand, a fastening between the flange (2) and the support frame (1) according to a force of given direction, having a component in a direction Y horizontal and orthogonal to the direction X of movement of the vehicle and, on the other hand, a guiding of the support frame (1) relative to the chassis in the direction of movement of the vehicle, in the event of impact.

3. The front-end module as claimed in claim 2, in which the recess (10) comprises one of a top guiding wall (11) and a bottom guiding wall (12).

4. The front-end module as claimed in claim 3, in which the bottom guiding wall (12) is intended to cooperate with a bottom wall (14) of the flange (2) as abutment in the event of force exerted upward on the support frame (1).

5. The front-end module as claimed in claim 3, in which the top guiding wall (11) is intended to cooperate with a top wall (13) of the flange (2) to support the support frame (1).

6. The front-end module as claimed in claim 2, in which the recess (10) comprises a side wall (15), provided with a slot (16) for passage of a fastening rod (17) of the support frame (1), the rod (17) being oriented in a direction given to the fastening force.

7. The front-end module as claimed in claim 6, in which the slot (16) has a form that flares outward in the direction X of movement of the vehicle.

8. The front-end module as claimed in claim 2, in which the recess (10) has a bottom wall (20) provided with an opening (21), intended to be oriented along the axis X of movement of the vehicle and cooperating with a guiding pin (22) of the flange (2).

9. The front-end module as claimed in claim 6, in which the flange (2) comprises a recess (40) for passage of the fastening rod (17) of the support frame (1).

10. The front-end module as claimed in claim 1, in which the flange (2) comprises a recess for the passage of a rod for fastening to the chassis of the vehicle.

11. The front-end module as claimed in claim 1, in which the flange comprises a recess (42) for fastening headlights or optical blocks of the vehicle.

12. A flange (2) for coupling a support frame (1) to a chassis of a vehicle with the flange (2) configured to have a portion to be received in a recess (10) of the support frame (1) to allow free positioning of a front-end module relative to the chassis in a plane orthogonal to a direction X of movement of the vehicle as well as a fastening of the front-end module to the chassis according to the positioning, and with the flange (2) configured to be fastened to the support frame (1) while allowing a movement of at least one of the flange (2) and the support frame (1) relative to the other in a direction X of movement of the vehicle in the event of impact.

13. A support frame (1) for coupling to a chassis of a vehicle by a flange (2) with the support frame (1) including a recess (10) for receiving a portion of the flange (2) and configured to be fastened to the flange (2) while allowing a movement of at least one of the flange (2) and the support frame (1) relative to the other in a direction X of movement of the vehicle in the event of impact.

14. An assembly including the front-end module (70) as claimed in claim 1 and an impact absorption device (71).

15. The assembly as claimed in claim 14, in which the impact absorption device (71) comprises plates (6) for fastening a bumper beam (72) and in which the flanges (2) are fastened to the plates (6).

16. The front-end module as claimed in claim 3, in which the recess (10) comprises a side wall (15), provided with a slot (16) for passage of a fastening rod (17) of the support frame (1), the rod (17) being oriented in a direction given to the fastening force.

17. The front-end module as claimed in claim 3, in which the recess (10) has a bottom wall (20) provided with an opening (21), intended to be oriented along the axis X of movement of the vehicle and cooperating with a guiding pin (22) of the flange (2).

\* \* \* \* \*